July 11, 1967  J. H. BERTIN ET AL  3,330,384
BRAKING DEVICE FOR GROUND EFFECT VEHICLES MOVABLE ALONG A TRACK
Filed March 8, 1965
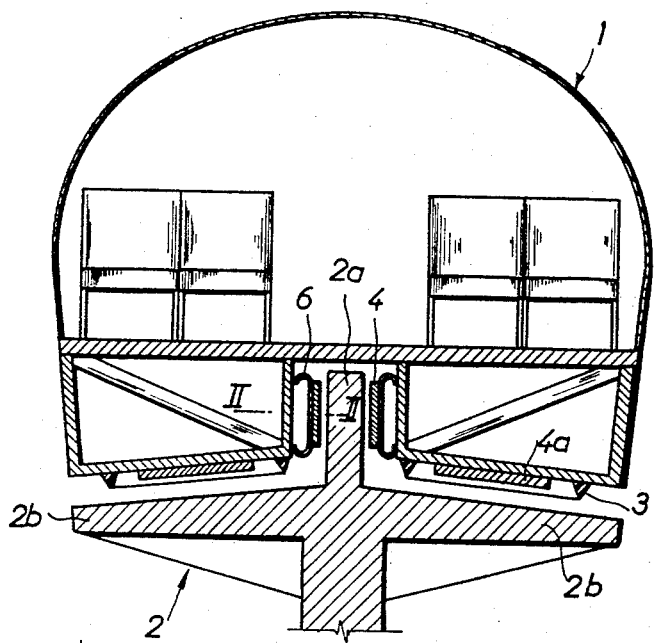
Fig.:1
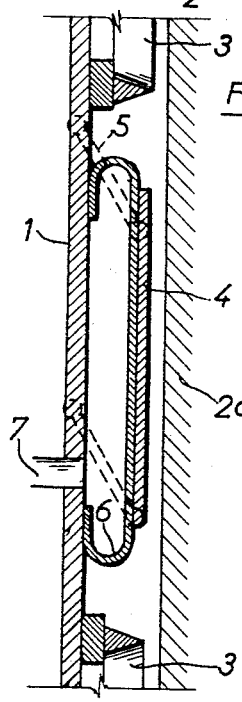
Fig.:2
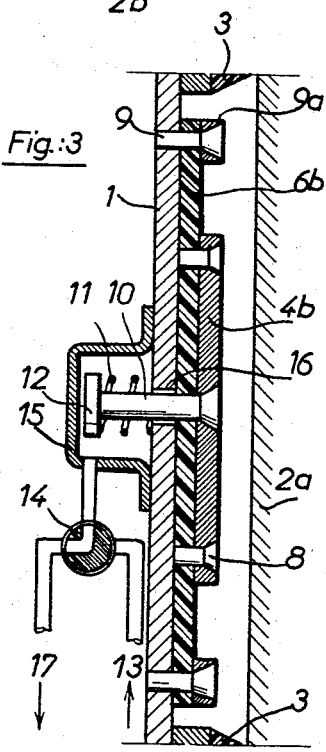
Fig.:3

United States Patent Office 3,330,384
Patented July 11, 1967

3,330,384
BRAKING DEVICE FOR GROUND EFFECT
VEHICLES MOVABLE ALONG A TRACK
Jean Henri Bertin, Neuilly-sur-Seine, and Paul François
Guienne, Paris, France, assignors to Societe Bertin &
Cie, Paris, France, a company of France
Filed Mar. 8, 1965, Ser. No. 437,658
Claims priority, application France, Mar. 10, 1964,
966,859
6 Claims. (Cl. 188—38)

This invention relates to ground effect vehicles which are supported and guided, through the medium of fluid cushions, by tracks comprising substantially horizontal supporting surfaces and substantially vertical oppositely orientated guiding surfaces preferably forming part of a central rail.

It is the object of the present invention to render such vehicles more practical, effective and reliable by utilizing, for normal braking of the vehicle, brake-shoes positioned on opposite sides of the central rail and adapted to clamp the same between them. If desired, these braking means may be associated to aerodynamic braking obtained by reversing the pitch of a propelling airscrew.

Emergency braking is obtained through the agency of brake-shoes provided beneath the vehicle. These brake-shoes can be collapsible. Alternately, they are of the fixed type, and positioned substantially level with the lips of deformable seals bounding the supporting air cushions preferably somewhat upwardly thereof in order not to develop appreciable retardation forces in the event of momentary casual contact. These brake-shoes are preferably provided over their bottom surface with a lining made of a material with a high coefficient of friction, and may have a large area in order to reduce wear and distribute the braking stresses over a large part of the vehicle floor. The body of the vehicle can thus be of at least relatively simple and light construction.

It has already been proposed that two cushions be used for guidance and support, respectively, and that these cushions be preferably supplied by a common compressor or by two compressors driven by a single engine. With such an arrangement, however, a failure of the common engine or the common compressor will result in a simultaneous, though progressive, reduction in the lifting force, with a consequent instant and likewise progressive actuation of the emergency braking system.

On the other hand, it is possible to supply a plurality of guiding or supporting air cushions independently for all practical purposes.

The description which follows with reference to the accompanying non-limitative exemplary drawings will give a clear understanding of how the invention can be carried into practice.

In the drawings,

FIGURE 1 shows in cross-section the bottom part of a vehicle and a track according to the invention and illustrates the braking device with which the vehicle is equipped;

FIGURE 2 shows in horizontal section through the line II—II of FIGURE 1 the manner in which certain of the brake-shoes and their supports are devised; and FIGURE 3 shows in horizontal section an alternative form of embodiment of said brake-shoes.

Reference is first had to FIGURE 1 for a cross-sectional view of a vehicle 1 associated to a guiding track 2 made of concrete for example and comprising a vertical axial rail 2a and two substantially horizontal supporting flanges 2b. Through the medium of a plurality of air cushions bounded by deformable peripheral seals 3, the vehicle 1 bears alike against the sides of the vertical rail 2a and against the supporting surfaces of the flanges 2b.

FIGURE 1 shows a type of brake which can readily be devised and which can be used for normal braking purposes prior to actual halting, as well as for emergency braking, and FIGURE 2 shows these brakes in schematic horizontal section through the line II—II of FIGURE 1. These brakes comprise a friction lining 4 made of any of the customary materials having a high coefficient of friction and a very low heat conductivity coefficient. Guiding means 5 act as the necessary tension members, an example being rods or cables connecting the shoe 4 to the vehicle structure, while further means permit of applying the brake-shoe 4 against the track. By way of example, a fluidtight chamber with deformable walls 6 is mounted between the brake-shoe and the vehicle body, a conduit 7 being provided to convey a pressure-fluid thereinto as desired.

Preferably, such brakes are mounted on opposite sides of a central rail 2a which they are adapted to clamp between them, such an arrangement rendering the braking force independent of the weight of the vehicle. Beneath the vehicle are provided further brake-shoes 4a, which are preferably used for emergency braking and which may with advantage be rigidly fixed to the underside of the vehicle, the thickness of the linings on these brakes not exceeding the thickness of the deformable seals. Thus, a failure in the lift compressors or, what amounts to the same thing (since the lift and guidance compressors are preferably one and the same), a failure in the guidance compressors, will result in a gradual reduction of the pressure inside the supporting cushions, causing the weight of the vehicle to gradually bear on the brake-shoes 4a.

FIGURE 3 shows likewise in horizontal schematic section an alternative embodiment of this braking system. The brake lining 4b, made of wood for instance, is fixed by means of countersunk rivets 8 to a fluid-tight and elastic sheet 6b which may be reinforced with wire strands possessing a slight degree of elasticity and preferably positioned longitudinally relative to the vehicle.

The diaphragm 6b is leaktightly secured to the vehicle structure by means of countersunk rivets 9 and seals 9a. This diaphragm is rigidly connected to a rod 10 which urges it toward the vehicle structure responsively to a spring 11 bearing against a stop 12 rigid with the rod 10. Fluid under pressure is admitted through a conduit 13 embodying a three-way valve 14, through a fluidtight enclosure 15 and through a passageway 16 between the diaphragm 6b and the vehicle structure 1, and this fluid distends the diaphragm and applies the brake-shoe against the track. The pressures for distending the diaphragm 6b and applying the shoe 4 against the track are adjustable independently of the weight of the vehicle 1.

A suction conduit 17 makes it possible, where necessary, to generate a vacuum for supplementing the return force exerted by the spring 11.

Obviously, the driver can make independent or simultaneous use of the brakes 4 and the propelling system (a resversible-pitch propeller, notably) for braking the vehicle.

It goes without saying that the present invention is by no means restricted to the specific forms of embodiment described hereinabove, but that many chansges and substitutions of parts may be made without departing from the scope of the invention. By way of example, the brake-shoes 4a could also be mounted on a deformable diaphragm such as 6 or 6b.

What is claimed is:

1. In a ground effect vehicle designed to move along a track having a bearing surface portion and a braking surface portion distinct from said bearing surface portion, said vehicle being adapted to move along said track with interposed fluid cushions bearing against said track bearing surface portion, a braking device comprising a pressure responsive, deformable wall element carried by said vehicle and positioned adjacent to but spaced from said track braking surface portion, means on said vehicle for selectively applying fluid pressure to said wall element to deform the same toward said track braking surface portion, and a friction pad fitted on said wall element to frictionally engage said track braking surface portion upon application of said fluid pressure.

2. Braking device as claimed in claim 1, further comprising tension members extending between said vehicle and said friction pad.

3. Braking device as claimed in claim 1, comprising two wall element and friction pad assemblies positioned on opposite sides of said track braking surface portion and movable in opposite directions to clamp the same upon application of fluid pressure.

4. Braking device as claimed in claim 1, further comprising return means associated with said wall element for urging the same away from said track braking surface portion upon relief of said fluid pressure.

5. Braking device as claimed in claim 1, further comprising brake-shoes fixed underneath said vehicle above and adjacent to said track bearing surface portion to automatically engage said bearing surface portion upon substantial decrease of the fluid cushion sustaining effect.

6. Braking device as claimed in claim 5, wherein said fluid cushions are laterally bounded by deformable seals projecting toward said track bearing surface portion to an extent at least equal to the thickness of said brake-shoes.

References Cited

UNITED STATES PATENTS

| 2,885,030 | 5/1959 | Aikman | 188—5 |
| 3,096,854 | 7/1963 | Price et al. | 118—42 |
| 3,167,154 | 1/1965 | Salvetti | 188—5 |
| 3,190,235 | 6/1965 | Bertin et al. | 180—7 X |

FOREIGN PATENTS

| 368,127 | 3/1932 | Great Britain. |
| 785,447 | 10/1957 | Great Britain. |

DUANE A. REGER, *Primary Examiner.*

UNITED STATES PATENT OFFICE
CERTIFICATE OF CORRECTION

Patent No. 3,330,384                                July 11, 1967

Jean Henri Bertin et al.

It is certified that error appears in the above identified patent and that said Letters Patent are hereby corrected as shown below:

In the heading to the printed specification, lines 5 and 6, "assignors to Societe Bertin & Cie, Paris, France, a company of France" should read -- assignors, by mesne assignments, to Societe D'Etudes De L'Aerotrain, Plaisir (Seine et Oise), France, a corporation of France --.

Signed and sealed this 23rd day of December 1969.

(SEAL)
Attest:

Edward M. Fletcher, Jr.                         WILLIAM E. SCHUYLER, JR.
Attesting Officer                                    Commissioner of Patents